(12) United States Patent
Mochizuki

(10) Patent No.: US 6,422,856 B1
(45) Date of Patent: Jul. 23, 2002

(54) HOT RUNNER SYSTEM FOR MOLDING PREFORMS

(75) Inventor: Takekazu Mochizuki, Nagano-ken (JP)

(73) Assignee: A.K. Technical Laboratory, Inc., Negano-ken (JP)

( * ) Notice: Subject to any disclaimer, the term of this patent is extended or adjusted under 35 U.S.C. 154(b) by 0 days.

(21) Appl. No.: 09/409,578

(22) Filed: Sep. 30, 1999

(30) Foreign Application Priority Data

Jan. 10, 1998 (JP) .......................... 10-280232

(51) Int. Cl.[7] .................. B29C 45/72; B29C 45/74
(52) U.S. Cl. ....................... 425/548; 425/547
(58) Field of Search ........................ 425/547, 548, 425/549, 542, 551

(56) References Cited

U.S. PATENT DOCUMENTS

| | | | | |
|---|---|---|---|---|
| 3,535,742 A | * | 10/1970 | Marcus | 425/146 |
| 3,677,682 A | * | 7/1972 | Putkowski | 425/192 |
| 4,268,240 A | | 5/1981 | Rees et al. | 425/548 |
| 4,276,014 A | * | 6/1981 | Aoki | 425/548 |
| 4,501,550 A | * | 2/1985 | Nikkuni | 425/549 |
| 5,007,821 A | * | 4/1991 | Schmidt | 425/548 |
| 5,378,139 A | | 1/1995 | Schad et al. | 425/549 |

FOREIGN PATENT DOCUMENTS

| | | | |
|---|---|---|---|
| DE | 3310928 A1 | * | 9/1984 |
| DE | 3423254 A1 | * | 1/1986 |
| EP | 0090166 | | 10/1983 |
| EP | 0264723 | | 4/1988 |
| EP | 0309585 | | 4/1989 |
| EP | 0630733 | | 12/1994 |
| GB | 2022002 | | 12/1979 |
| JP | 62108030 | | 5/1987 |
| WO | WO 85/01470 | | 4/1985 |

* cited by examiner

Primary Examiner—Tim Heitbrink
Assistant Examiner—Emmanuel Luk
(74) Attorney, Agent, or Firm—Weingarten, Schurgin, Gagnebin & Lebovici LLP

(57) ABSTRACT

There is provided a hot runner system comprised of a cylindrical runner block (4) which has a hot runner (12) extending through a core portion thereof to communicate between a gate formed on a lengthwise central portion of a side surface of the runner block (4) and the interior of each of a plurality of nozzle members (3), the runner block (4) being enclosed by band heaters (15), blocking members for the hot runner (12), and support plates (6) standing on a base plate (8) and fitted to both end portions of the runner block (4). The blocking members (16) are fitted into both the end portions of the runner block (4). Heaters (22) and (23) are arranged into the core portion and around the periphery of each blocking member, respectively, for compensating for heat loss due to heat radiation and heat transfer to the support plates (6) and for keeping the temperature of each end portion of the runner block in a predetermined temperature range.

2 Claims, 3 Drawing Sheets

HOT RUNNER SYSTEM FOR MOLDING PREFORMS

BACKGROUND OF THE INVENTION

1. Field of the Invention

The present invention relates to a hot runner system for molding preforms, and more particularly to a hot runner system which is capable of simultaneously molding a plurality of preforms per injection packing of a resin.

2. Background Art

Thin containers such as PET (polyethylene terephthalate) bottles are molded by subjecting injection-molded preforms to stretch blowing in a blow mold. Further, a plurality of preforms are injection-molded per one molding operation, and therefore a so-called hot runner system is employed as an injection molding machine for molding preforms. Generally, the hot runner system is comprised of a runner block, a gate formed on a side surface of the runner block at a lengthwise central portion thereof, and a plurality of nozzle members protruding from respective upper portions of the runner block. The runner block has a hot runner internally extending through a core portion thereof, such that the hot runner communicates between the gate and each of the nozzle members. The runner block is supported at the lengthwise central portion thereof and both end portions thereof by means of support plates standing on a base plate.

The runner block has its periphery enclosed by band heaters which function to uniformly heat the entire runner block, to thereby keep the temperature of the molten resin contained in the hot runner to a constant value. In addition, additional band heaters are attached to peripheries of the nozzle members, the gate member, etc. in order to uniform the molten resin and prevent its temperature from decreasing. However, due to its mechanical structure, the temperatures at the lengthwise central portion and the end portions of the block runner show a tendency to decrease.

This tendency is considered to be caused by heat loss due to heat transfer to the support plates supporting the lengthwise central portion and the end portions of the runner block as well as heat radiation at the end portions of the runner block. The heat transfer to the central support plate can be suppressed relative to the heat transfer to both the end support plates because of heat from the injection device transferred by nozzle touch. On the other hand, at the end portions of the runner block, the temperature of the resin flowing through the hot runner decreases and become non-uniform, which disadvantageously results in one-sided wall of preforms made from the resin injected from the nozzle members at the end portions which are located at the farthest locations from the gate.

This disadvantage can be overcome by interposing heat insulating materials between the runner block and the respective support plates, and further by covering both end surfaces with heat insulating materials. However, this can cause another disadvantage. That is, each nozzle member abuts a cavity gate of the injection mold for molding preforms, and therefore high accuracy is required for fitting the support plates to the runner block. In addition, compressing force by the injection device due to the nozzle touch is supported by both fitting portions between the runner block and the support plates, at the end portions of the runner block. If the heat insulating materials are interposed, the fitting portions can become deformative, which damages horizontality of the runner block, and therefore the nozzle touch with the entire cavity gates cannot be appropriately performed, resulting in resin leakage. Further, prevention of the heat radiation by covering the runner block, etc. with the heat insulating materials is difficult from the standpoint of the mechanical structure. Therefore, it is difficult to overcome the disadvantage by employing the heat insulating materials.

SUMMARY OF THE INVENTION

It is therefore an object of the present invention to provide a hot runner system for molding preforms, which is new in construction and capable of overcoming a disadvantage of heat loss at both end portions of the runner block, by heating both the end portions per se.

To attain the object, the present invention provides a hot runner system for molding preforms, being arranged under a preform-molding injection mold having cavity gates, the hot runner system including a plurality of nozzle members abutting the cavity gates of the injection mold, respectively, a cylindrical runner block having a gate formed on a lengthwise central portion of a side surface thereof, the runner block mounting therein the plurality of nozzle members such that the nozzle members protrude from respective upper portions of the runner block, the runner block having a hot runner extending through a core potion thereof to communicate between the gate and an interior of each of the plurality of nozzle members, the runner block having band heaters enclosing a periphery thereof, blocking members fitted into both end portions of the runner block, for blocking the hot runner, and support plates fitted to the runner block at both the end portions of the runner block, the hot runner system comprising a heater inserted into a core portion of each of the blocking members and a heater enclosing a periphery of the each of the blocking members, for compensating for heat loss due to heat radiation and heat transfer to the support plates, to thereby keep temperature at the each of the end portions of the runner block in a predetermined range of temperature.

Preferably, the each of the blocking members is of an inside plug shape and formed by a lid body which is fitted into a concave portion formed in an end surface of the runner block, and a shaft portion which is fitted into a runner opening which is larger in diameter than the hot runner, and wherein the heaters for compensating for the heat loss comprise a cartridge heater embedded in the shaft portion and having a length from an external end surface of the lid body to a portion close to an end portion of the hot runner, and a heating plate tightly attached to the external end surface of the lid body together with a second band heater enclosing the same.

In the construction described as above, the internal and external heaters provided for each of the blocking members function as heating members at the respective end portions of the runner block. As a result, the heat loss caused by the heat radiation and the heat transfer at both the end portions can be eliminated, to thereby prevent non-uniformity in temperature at both the end portions of the runner block due to temperature decrease. Therefore, heating by the band heaters enclosing the periphery of the runner block can be uniformly kept in the entire runner block, to thereby keep the temperature of the entire runner block in the predetermined range. In this manner, it is prevented that preforms are one-sided due to the temperature decrease of a resin injected from the nozzle members arranged at both the end portions of the runner block.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

The invention will now be described in detail with reference to the drawings showing an embodiment thereof. In the embodiment, description will be made of a hot runner system for molding preforms, in which each of nozzle members has a needle valve extending therethrough, by way of example.

Figure 1:
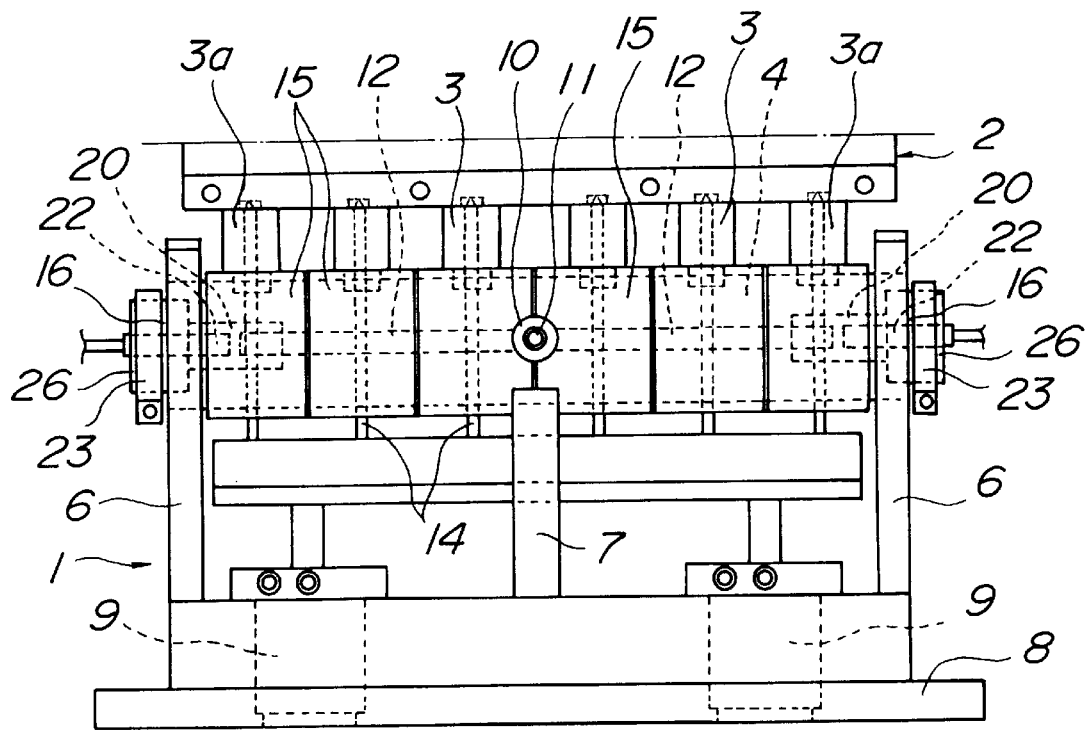
FIG. 1 is an elevation view showing a hot runner system for molding preforms, according to an embodiment of the present invention.
Figure 2:
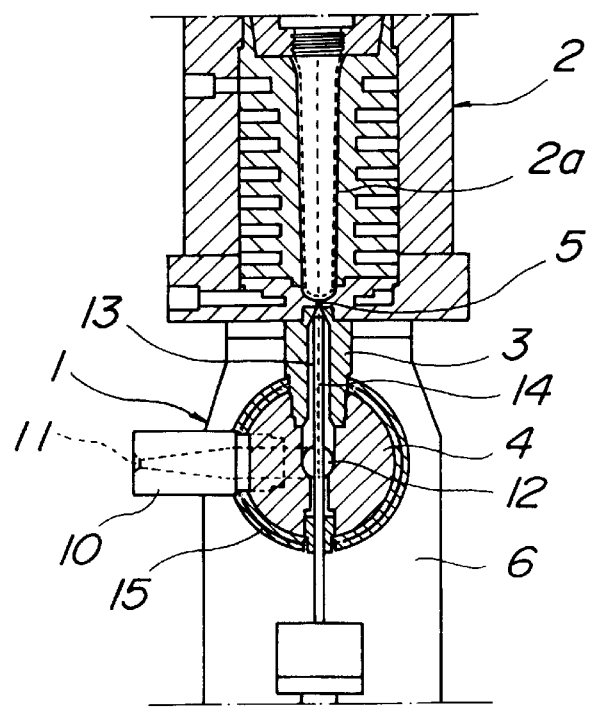
FIG. 2 is a fragmental longitudinal sectional view of the essential part of the hot runner system shown in FIG. 1.

Referring to FIG. 1 and 2, there is schematically illustrated the construction of a hot runner system according to the embodiment. In the figures, reference numeral 1 designates a hot runner system which is arranged under an injection mold 2 for molding preforms. The hot runner system 1 is comprised of a plurality of nozzle members 3, a cylindrical runner block 4, support plates 6 fitted to both end portions of the runner block 4, respectively, and a central support plate 7 fitted to a lengthwise central portion of the runner block 4. As shown in FIG. 2, the nozzle members 3 abut against respective gates 5 each of which opens a preform molding cavity 2a of the injection mold 2 at a widthwise central portion of a bottom surface of the injection mold 2. The nozzle members 3 are mounted in respective upper portions of the runner block 4 at regular intervals. The support plates 6 and the central support plate 7 stand on an upper surface of a base plate 8. The upper surface of the base plate also has arranged thereon a pair of pneumatically or hydraulically driven needle valve devices 9.

The runner block 4 has a hot runner 12 arranged therein, which extends from a gate 11 in a bush 10 formed on a side surface of the runner block 4 at a lengthwise central portion thereof, to a tip of each nozzle member 3. The interior of the horizontal hot runner 12 communicates with vertical nozzle-side runners 13 each of which reaches the interior of the nozzle member 3. A needle valve 14 for opening and closing a nozzle port is inserted from the needle valve device 9 through the runner block 4 into the nozzle-side runner 13 in a freely advancing and retreating manner. The runner block 4 has its periphery entirely enclosed by band heaters 15 for keeping the temperature of a molten resin contained in the hot runner 12.

Figure 3:
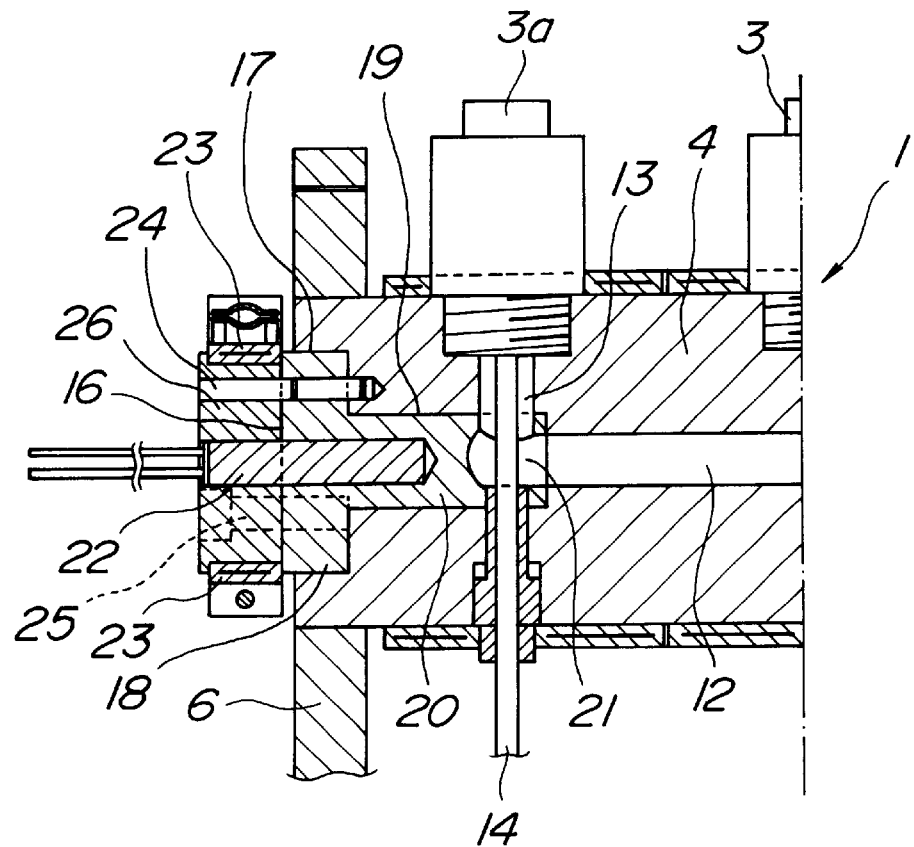
FIG. 3 is a longitudinal sectional view of the essential part of the hot runner system according to the embodiment of the present invention.
Figure 4:
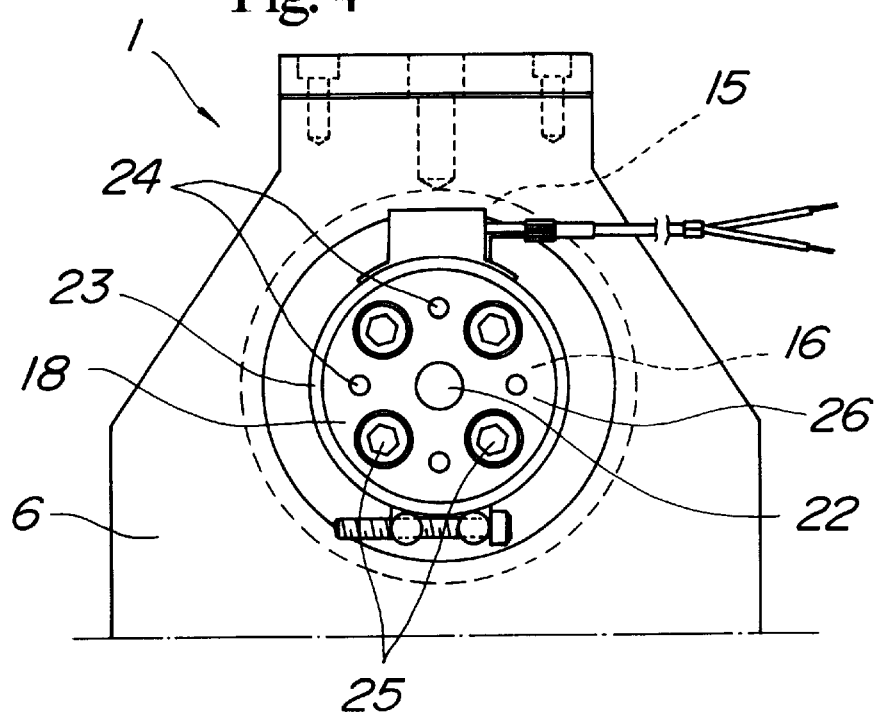
FIG. 4 is a side view of the hot runner system shown in FIG. 3.

As illustrated in FIGS. 3 and 4 in detail, the hot runner 12 is formed by drilling a through hole through a core portion of the runner block 4, with both end portions thereof being blocked by blocking members 16, respectively. Each of the blocking members 16 is fitted into the core portion of the end portion of the runner block 4. The blocking member 16 is of an inside plug shape and formed by a lid body 18 which is fitted into a concave portion. 17 formed in an end surface of the runner block 4, and a shaft portion 20 which is fitted into a runner opening 19 which is larger in diameter than the hot runner 12. The tip of the shaft portion 20 has a concave portion 21 formed therein to accept the end portion of the hot runner 12.

Inside the shaft portion 20 of the blocking member 16 is embedded a cartridge heater 22 having a length from an external end surface of the lid body 18 to a portion close to the concave portion 21.

Further, tightly fitted to an external side surface of the lid body 18 in one body is a heating plate 26 together with a band heater 23 enclosing the same, by means of bolts 25. The blocking member 16 is locked to the end surface of the runner block 4 together with the heater plate 26 by means of pins 24.

Figure 5:
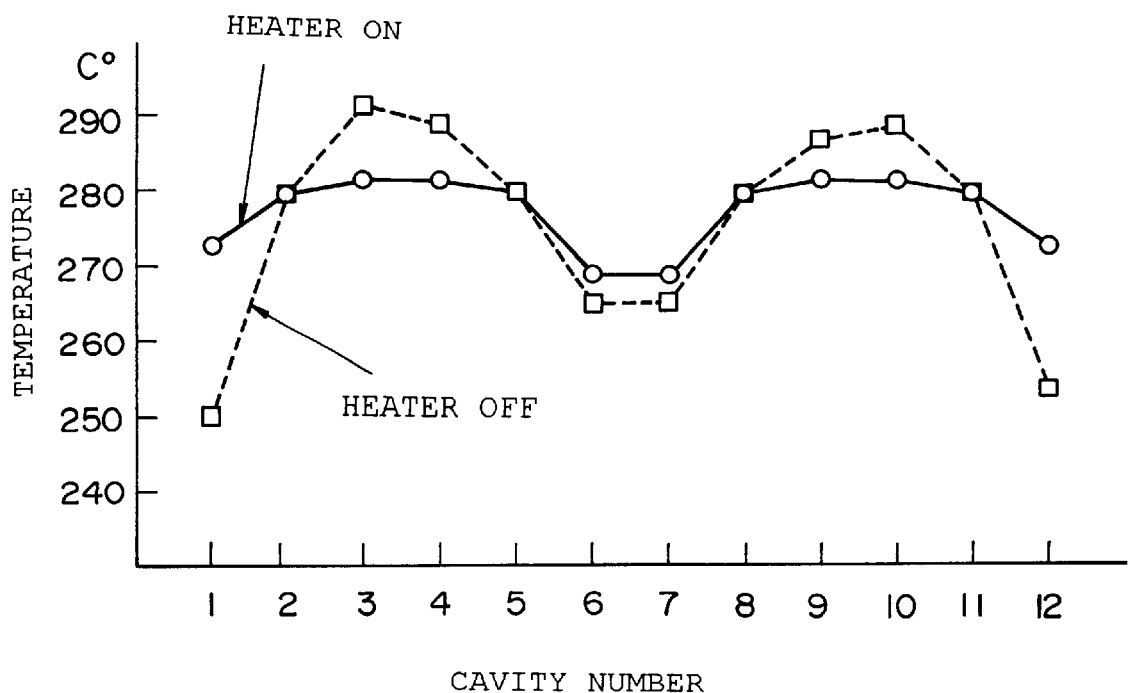
FIG. 5 is a graph showing temperature distribution, which is useful in explaining a change in temperature before and after heating at each end of the runner block, according to the hot runner system.

FIG. 5 is a graph showing changes in temperature at each end portion of the runner block 4 having twelve nozzle members 3 provided therefor. Both the shaft portion 20 and the lid body 18 were heated to 250° C. by the cartridge heater 22 and the band hater 23. Thereafter, the temperatures at 250° C. at the end portions of the runner block 4 were risen to 270° C. or above, and therefore temperature decrease due to heat radiation at the end portions of the runner block 4 and heat transfer to the support plates was prevented, whereby the temperatures at the end portions were kept in the predetermined range of temperature (265° C. to 285° C.). In addition, it is understood that the temperature at the lengthwise central portion of the runner block 4 was slightly risen, which leads to the fact that the temperature of the entire runner block 4 was uniformed compared with the temperature before heating.

As described hereinabove, by virtue of the construction of the hot runner system according to the invention, heat loss due to heat radiation at both the end portions of the runner block 4 to which are fitted the support plates 6 and heat transfer to the support plates is eliminated. As a result, temperature decrease at both the end portions of the runner block 4 can be prevented, which leads to effective and uniform heating of the runner block 4 by means of the band heaters 15 enclosing the same. Therefore, it is prevented that preforms are one-sided due to temperature decrease of the resin injected from the nozzle members 3a arranged at both the end portions of the runner block 4.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A hot runner system for molding preforms, being arranged under a preform-molding injection mold having cavity gates, said hot runner system including:

a plurality of nozzle members abutting said cavity gates of said injection mold, respectively;

a cylindrical runner block having a gate formed on a lengthwise central portion of a side surface thereof, said runner block mounting therein said plurality of nozzle members such that said nozzle members protrude from respective upper portions of said runner block, said runner block having a hot runner extending through a core portion thereof to communicate between said gate and an interior of each of said plurality of nozzle members, said runner block having band heaters enclosing a periphery thereof;

blocking members fitted into both end portions of said runner block, for blocking said hot runner; and support plates fitted to said runner block at both said end portions of said runner block;

said hot runner system comprising a heater inserted into a core portion of each of said blocking members and a heater enclosing a periphery of said each of blocking members, for compensating for heat loss due to heat radiation and heat transfer to said support plates, to thereby keep temperature at said each of said end portions of said runner block in a predetermined range of temperature, wherein said each of blocking members is of an inside plug shape and formed by a lid body which is fitted into a concave portion formed in an end surface of said runner block, and a shaft portion which is fitted into a runner opening which is larger in diameter than said hot runner, and wherein said heaters for compensating for said heat loss comprise a cartridge heater embedded in said shaft portion and having a length from an external end surface of said lid body to a portion close to an end portion of said hot runner, and a heating plate tightly attached to said external end surface of said lid body together with a second band heater enclosing the same.

2. A hot runner system as claimed in claim 1, further including a base plate having an upper surface on which said support plates stand, and at least one pneumatically or hydraulically driven needle valve device.

* * * * *